United States Patent
Tanaka

(10) Patent No.: US 11,419,455 B2
(45) Date of Patent: Aug. 23, 2022

(54) FRYER

(71) Applicant: evertron Inc., Tokyo (JP)

(72) Inventor: Hisao Tanaka, Tokyo (JP)

(73) Assignee: EVERTRON INC., Tokyo (JP)

( * ) Notice: Subject to any disclaimer, the term of this patent is extended or adjusted under 35 U.S.C. 154(b) by 924 days.

(21) Appl. No.: 16/308,427

(22) PCT Filed: Jan. 13, 2017

(86) PCT No.: PCT/JP2017/001038
§ 371 (c)(1),
(2) Date: Dec. 7, 2018

(87) PCT Pub. No.: WO2018/131140
PCT Pub. Date: Jul. 19, 2018

(65) Prior Publication Data
US 2019/0174956 A1 Jun. 13, 2019

(51) Int. Cl.
*A47J 37/12* (2006.01)
(52) U.S. Cl.
CPC ....... *A47J 37/1261* (2013.01); *A47J 37/1209* (2013.01); *A47J 37/1276* (2013.01); *A47J 37/1295* (2013.01); *A47J 37/12* (2013.01)
(58) Field of Classification Search
CPC .... A47J 37/12; A47J 37/1204; A47J 37/1209; A47J 37/1242; A47J 37/1257; A47J 37/1295
See application file for complete search history.

(56) References Cited

U.S. PATENT DOCUMENTS

| | | | | |
|---|---|---|---|---|
| 2,868,112 A | * | 1/1959 | Bushway | A47J 37/1209 99/410 |
| 6,590,187 B1 | * | 7/2003 | Kaneko | A47J 37/1276 219/430 |
| 2018/0116459 A1 | * | 5/2018 | Lin | A47J 37/1209 |

FOREIGN PATENT DOCUMENTS

| | | |
|---|---|---|
| CN | 1484508 A | 3/2004 |
| CN | 201759405 U | 3/2011 |
| CN | 203676899 U | 7/2014 |
| CN | 104736027 A | 6/2015 |

(Continued)

OTHER PUBLICATIONS

Office Action in SG application No. 11201910534P, dated Sep. 24, 2021, 7pp.

(Continued)

*Primary Examiner* — Reginald Alexander
(74) *Attorney, Agent, or Firm* — Hauptman Ham, LLP

(57) ABSTRACT

An easy handling and installable fryer for cooking materials in an electric-field carrying space includes an oil pot base including an oil pot having an inner surface at least partially being a metal plate, and a metal mesh basket placeable in and out of the pot. The base includes a pot fastener that allows the basket to be placed in the pot without electricity conduction to the inner surface, and a conductor including a conducting electrode on an upper portion of a pot surface opposing a handling side, and insulated from the inner surface that conducts an alternating current to the basket in the pot. The basket includes a basket fastener that allows, with the pot fastener, the basket to be placed in the pot without electricity conduction to the inner surface, and an electricity receiver that receives electricity from the electrode and conducts electricity to the mesh basket metal.

9 Claims, 10 Drawing Sheets

(56) References Cited

FOREIGN PATENT DOCUMENTS

| | | | |
|---|---|---|---|
| JP | H10-179419 A | 7/1998 | |
| JP | 2006-187567 A | 7/2006 | |
| JP | 3179641 U | 11/2012 | |
| JP | 2012-254248 A | 12/2012 | |
| JP | 2013-5851 A | 1/2013 | |
| JP | 2014-42550 A | 3/2014 | |
| JP | 2015-27443 A | 2/2015 | |
| JP | 2017-12684 A | 1/2017 | |
| KR | 10-1412577 B1 | 6/2014 | |
| WO | WO-0238017 A1 * | 5/2002 | ........ A47J 27/21025 |
| WO | WO-2009155731 A * | 12/2009 | .......... A47J 37/1257 |

OTHER PUBLICATIONS

Office Action in CN application No. 201780035386.1, dated Apr. 27, 2021, 16pp.
International Search Report in PCT/JP2017/001038, dated Mar. 7, 2017, 4pp.
Office Action in ID Application No. P00201910295, dated Jun. 4, 2021, 8pp.
Office Action in CA application No. 3026995, dated Dec. 2, 2019, 3pp.

* cited by examiner

FRYER

RELATED APPLICATIONS

The present application is a National Phase of International Application No. PCT/JP2017/001038, filed Jan. 13, 2017.

FIELD

The present invention relates to a fryer for frying food materials.

BACKGROUND

Frying food materials with a fryer while applying an electric field to oil in the oil pot is known for improvements such as enhancing the flavors of food materials, reducing cooking time, reducing oil temperature decrease, and preventing oil degradation.

To apply an electric field to oil in an oil pot, a variety of electrode structures have been developed for electrodes for forming an electric field in the oil pot. For example, Patent Literature 1 describes a fryer including an electric-field forming unit in an oil pot. The electric-field forming unit includes a box-shaped fixed electrode with five surfaces closed except an upper surface and a lid-like movable electrode that closes the upper surface. In the space closed with these fixed and movable electrodes, food materials can be evenly fried in the oil while an electric field is being applied using all the six surfaces functioning as the electrodes.

However, the fryer described in Patent Literature 1 is not intended for use with a metal mesh for placing and removing food materials in and out of the oil pot. If a metal mesh is used with this fryer, and comes in contact with the movable electrode in the oil pot, the metal mesh also conducts a high voltage. In this case, the user of the fryer handling the metal mesh can receive an electric shock. The fryer user thus uses wooden chopsticks or other tools for placing and removing food materials for frying in and out of the oil pot, but can have inconvenience when frying a large amount of food materials.

Patent Literature 2 describes a fryer for cooking by allowing an electrode installed in an oil pot to come in contact with an electrode plate in a fryer basket to induce an electric field toward the electrode plate and thus to apply an electric field to oil in the oil pot. The fryer described in Patent Literature 2 is easier to install than the fryer described in Patent Literature 1. However, any crumbs accumulating on the electrode in the oil pot can obstruct contact of the electrode with the electrode plate, and disable an electric field from being applied to oil in the oil pot.

CITATION LIST

Patent Literature

Patent Literature 1: Japanese Unexamined Patent Application Publication No. 2012-254248

Patent Literature 2: Japanese Unexamined Patent Application Publication No. 2006-187567

BRIEF SUMMARY

Technical Problem

One or more aspects of the present invention are directed to an easy handling fryer for frying food materials while applying an electric field to oil stored in an oil pot.

Solution to Problem

A fryer according to a first aspect of the present invention includes an oil pot base including an oil pot having an inner surface that is at least partially a metal plate, and a basket placeable in and removable out of the oil pot. The basket includes a metal mesh. The oil pot base includes a pot fastener that allows the basket to be placed in the oil pot without the basket conducting electricity to the inner surface, and a conductor including a conducting electrode located in an upper portion of the oil pot on a surface of the oil pot opposing a handling side of the oil pot. The conducting electrode is insulated from the inner surface that conducts an alternating current to the metal mesh when the basket is placed in the oil pot. The basket includes a basket fastener that allows, in combination with the pot fastener, the basket to be placed in the oil pot without the basket conducting electricity to the inner surface, and an electricity receiver that receives electricity from the conducting electrode and conducts electricity to the metal mesh when the basket is placed in the oil pot.

A fryer according to a second aspect of the present invention is the fryer according to the first aspect in which the oil pot base includes a potential retaining unit that retains a potential of the metal plate of the oil pot at a predetermined potential.

A fryer according to a third aspect of the present invention is the fryer according to the first or second aspect further including a controller that controls the conductor to conduct electricity only when the pot fastener and the basket fastener are engaged with each other.

A fryer according to a fourth aspect of the present invention is the fryer according to one of the first to third aspects in which at least the pot fastener serves as the conductor, or the basket fastener serves as the electricity receiver.

A fryer according to a fifth aspect of the present invention is the fryer according to one of the first to fourth aspects in which the basket includes a handle insulated from the metal mesh in the basket.

A fryer according to a sixth aspect of the present invention is the fryer according to one of the first to fifth aspects in which the basket includes an insulating material in an area above a portion to be immersed in cooking oil in the oil pot.

A fryer according to a seventh aspect of the present invention is the fryer according to one of the first to sixth aspects in which the conductor conducts an alternating current to a first part of the basket.

A fryer according to an eighth aspect of the present invention is the fryer according to the seventh aspect in which a second part of the basket is grounded.

A fryer according to a ninth aspect of the present invention is the fryer according to the eighth aspect in which the basket is rectangular parallelepiped, and is symmetrically dividable about a line into the first part and the second part.

Advantageous Effects

The fryer according to these aspects includes a basket for placing and removing food materials for frying in and out of an oil pot to serve as an electrode for applying an electric field to the oil. The basket used for placing and removing food materials in and out of the oil pot is easy to handle, and allows an electric field to form without being obstructed by any crumbs accumulating in the oil pot.

DETAILED DESCRIPTION

Embodiments of the present invention will now be described with reference to the drawings. The invention is not limited to these embodiments or drawings, and may be embodied in various manners without departing from the spirit and scope of the invention.

Example Structure 1

Figure 1A:
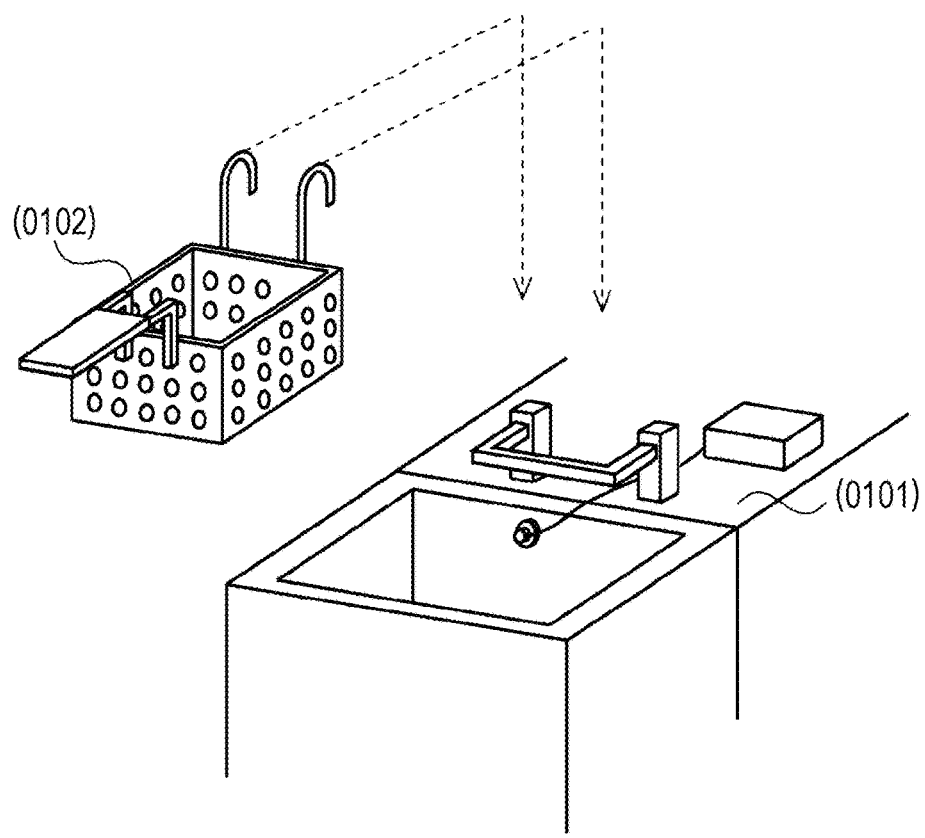
FIG. 1A and FIG. 1B are schematic diagrams of a fryer according to one embodiment of the present invention.
Figure 1B:
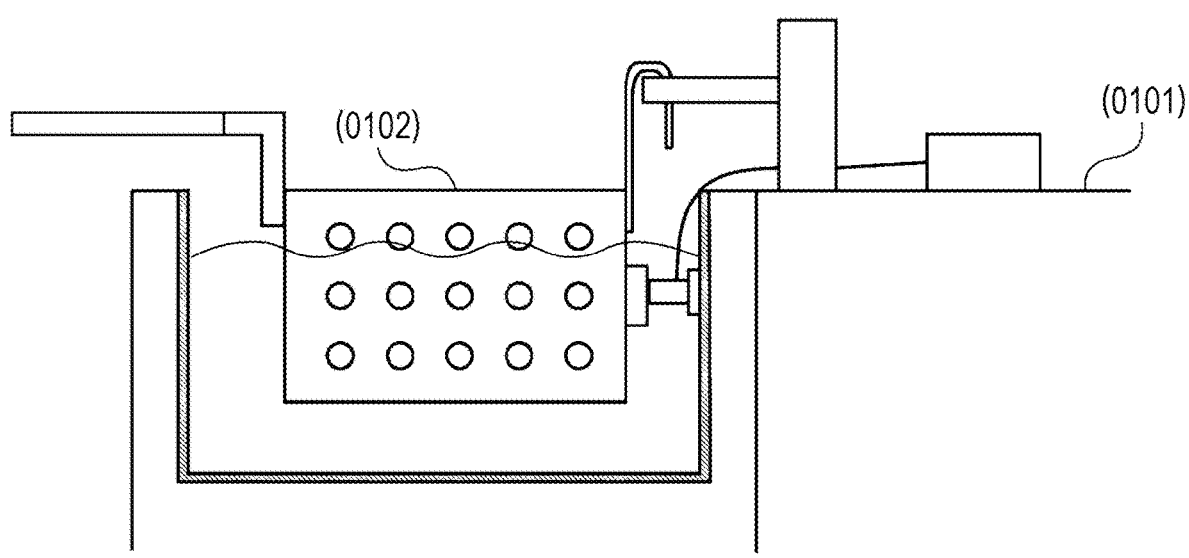

FIG. 1A and FIG. 1B are schematic diagrams of a fryer according to one embodiment of the present invention. FIG. 1A is a perspective view of the fryer, and FIG. 1B is a side view of the fryer showing the internal structure of the oil pot. The fryer according to the present embodiment includes an oil pot base 0101 and a basket 0102. The fryer has the same basic structure as a typical fryer for frying food materials without applying an electric field to oil in an oil pot. The fryer fries food materials placed in a basket immersed in high-temperature oil in the oil pot of the oil pot base. The fryer according to the present embodiment differs from a typical fryer in that the basket immersed in the oil conducts an alternating current and thus is used as an electrode for forming an electric field.

Oil Pot Base

Figure 2A:
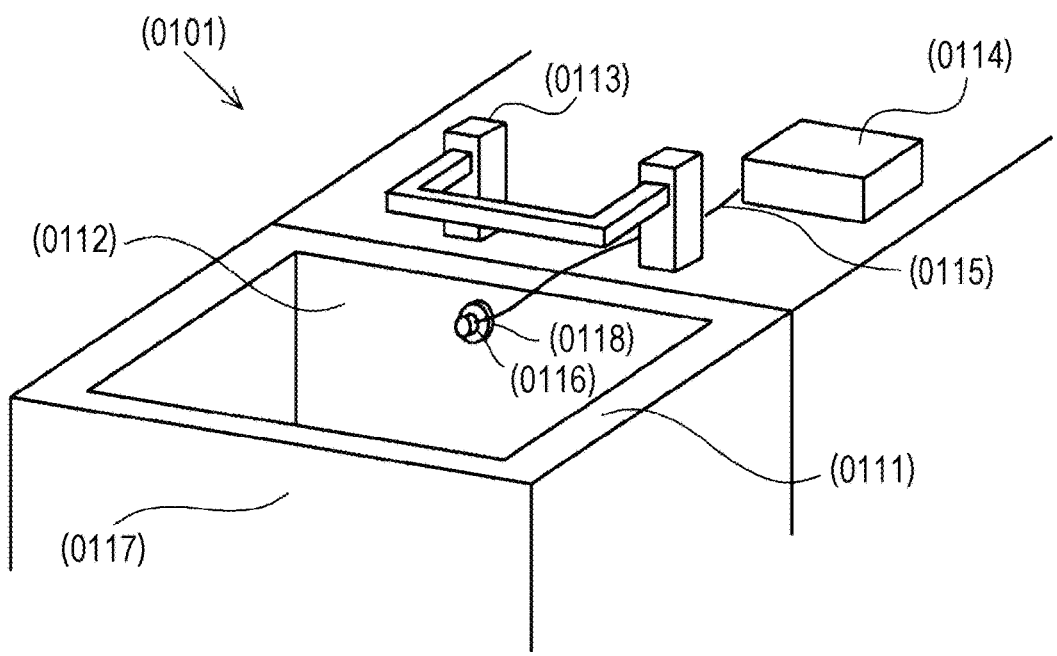
FIG. 2A and FIG. 2B are schematic diagrams of an oil pot base of a fryer according to one embodiment of the present invention.
Figure 2B:
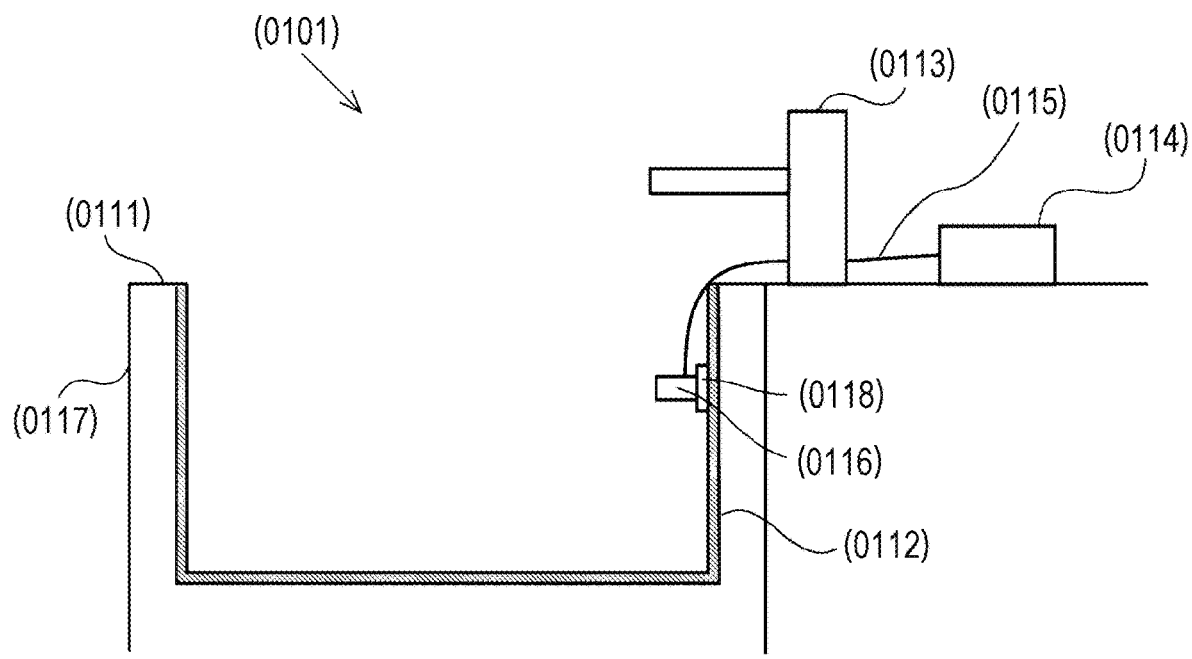

FIG. 2A and FIG. 2B are schematic diagrams of an oil pot base of a fryer according to one embodiment of the present invention. FIG. 2A is a perspective view of the oil pot base, and FIG. 2B is a side view of the oil pot base. The oil pot base includes an oil pot 0111 having inner surfaces that are at least partially a metal plate, a pot fastener, and a conductor.

Oil Pot

The oil pot 0111 defines a space for storing oil for frying food materials, and has inner surfaces 0112 that are at least partially a metal plate. The inner surfaces herein include inner sides and an inner bottom of the oil pot. In response to an alternating current flowing through the basket, a dynamo electric field forms between the metal plate of the inner surfaces of the oil pot and the side surfaces of the basket to apply an electric field to oil stored in the oil pot. The inner surfaces being partially a metal plate herein refer to the inner surfaces that are not necessarily entirely metal plates. Further, the inner surfaces may be either a metal plate, or may be a metal plate surface-coated with, for example, an insulating resin (Teflon, registered trademark). The metal place surface-coated with an insulating resin is insulated from the basket.

To heat oil in the oil pot to high temperature during cooking of food materials, the oil pot base includes a heater (not shown) for heating oil stored in the oil pot to high temperature. To heat oil to high temperature, for example, an electric or gas heater may be used.

Pot Fastener

The pot fastener allows the basket to be placed and immersed in the oil pot without the basket conducting electricity to the inner surfaces. Allowing the basket to be placed and immersed in the oil pot without the basket conducting electricity to the inner surfaces herein refers to allowing the basket to be placed and immersed in oil stored in the oil pot without the metal mesh in the basket and the metal plate of the inner surfaces of the oil pot conducting electricity between them. Any electricity conduction between the metal plate and the basket can cause the metal plate and the basket to have the same potential, thus failing to form a dynamo electric field between the metal plate and the basket. The pot fastener may have any structure, and may include a hanger 0113 adjacent to the oil pot to receive hooks, which serve as a basket fastener described below.

Conductor

The conductor includes a conducting electrode in an upper portion of the oil pot on the surface opposing a handling side of the oil pot. The conducting electrode is insulated from the inner surfaces for conducting an alternating current to the metal mesh when the basket is placed in the oil pot. A conducting electrode 0116 receives an alternating current from a power supply 0114 through a cable 0115. The fryer according to the present embodiment uses the basket conducting an alternating current to the basket through the conducting electrode as an electrode for forming an electric field. The conducting electrode may conduct an alternating current with any frequency, or specifically a frequency of, for example, 50 to 60 kHz. The voltage of electricity fed from the power supply to the basket may range from several volts to several tens of volts (e.g., 3 to 10 V).

A handling side 0117 refers to one side of the oil pot along which, for example, a fryer user places and removes the basket in and out of the oil pot. More specifically, a side surface opposing the handling side of the oil pot refers to an inner surface of the oil pot opposing the handling side. The upper portion of the oil pot opposing the handling side herein refers to an upper portion of an inner surface of the oil pot opposing the handling side, or for example, an area above the middle in the height of the inner surface opposing the handling side of the oil pot. The conducting electrode may be located on an inner surface of the oil pot or in an upper portion of the oil pot. The conducting electrode located on an inner surface of the oil pot may be immersed in oil stored in the oil pot.

As described in Patent Literature 2, a conducting electrode on the bottom of the oil pot can be obstructed by crumbs accumulating on the conducting electrode in the oil pot, and can fail to conduct an alternating current to the basket. In contrast, the conducting electrode on one side of the oil pot or in an upper portion of the oil pot receives no accumulating crumbs. This structure thus prevents conduction of an alternating current to the basket from being obstructed by crumbs.

Any conducting electrode on the handling side may apply an electric shock to a fryer user touching the conducting electrode. A conducting electrode on the surface opposing the handling side can minimize the likelihood of applying an electric shock to a fryer user.

The conducting electrode is to be insulated from the inner surfaces. Any conducting electrode electrically connected to the inner surfaces can conduct an alternating current between the inner surfaces and the basket, and thus causes the basket and the conducting electrode to have the same potential, failing to form a dynamo electric field between the inner surfaces and the basket. In the example shown in FIG. 2A and FIG. 2B, an insulator 0118 is located between the inner surfaces of the oil pot and the conducting electrode.

In some embodiments, the output of the power supply of the conductor is regulated to form an electric field with a constant magnitude within a predetermined range between the basket and the inner surfaces. For example, if the output of the power supply is fixed, the magnitude of an electric field forming in the basket can vary depending on, for example, the amount, components, or moisture contents of food materials stored in the basket. This involves adjustments of the time or temperature for cooking food materials. In the present embodiment, the output of the power supply is regulated to form an electric field with a constant magnitude between the basket and the inner surfaces to achieve stable cooking independently of the amount, components, or moisture contents of food materials.

Basket

Figure 3A:
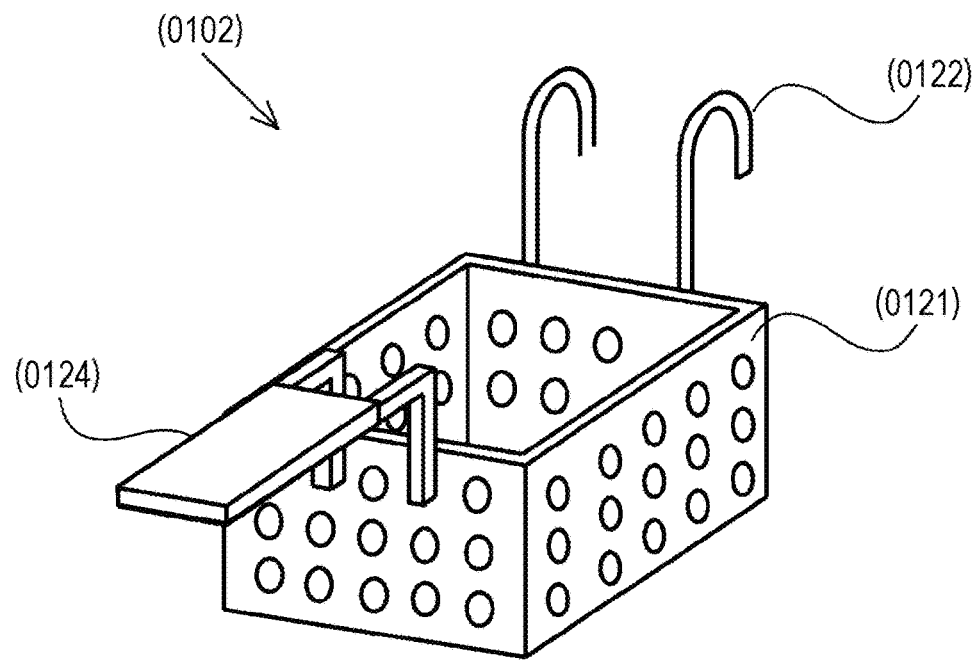
FIG. 3A and FIG. 3B are schematic diagrams of a basket for a fryer according to one embodiment of the present invention.
Figure 3B:
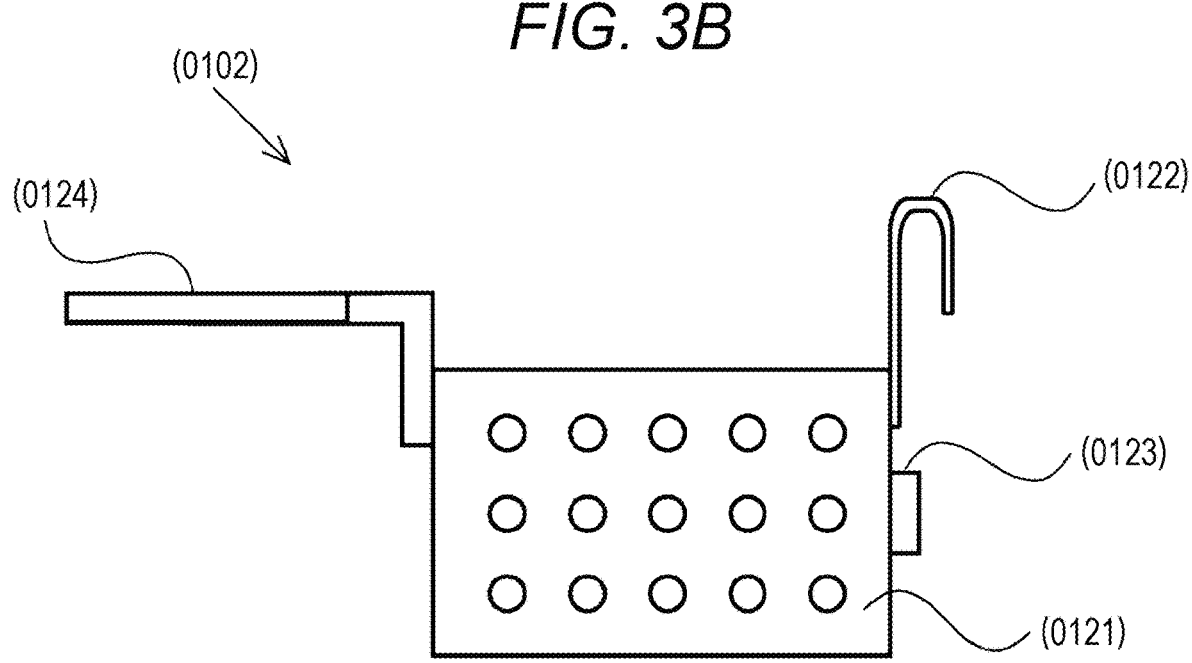

FIG. 3A and FIG. 3B show baskets for the fryer according to one embodiment of the present invention. FIG. 3A is a perspective view of the basket, and FIG. 3B is a side view of the basket. In the fryer according to the present embodiment, the basket 0102 includes a metal mesh 0121, and includes a basket fastener and an electricity receiver. The metal mesh of the side surfaces of the basket may be surface-coated with an insulating resin.

Including a metal mesh refers to the side surfaces of the basket including a metal mesh. The side surfaces of the basket herein also include the bottom of the basket, in addition to the sides of the basket. The metal mesh of the side surfaces of the basket allows the basket to conduct an alternating current and thus be used as an electrode for forming an electric field, and to form a dynamo electric field between the side surfaces of the basket and the inner surfaces of the oil pot. In some embodiments, the potential of the inner surfaces of the oil pot may be set higher than the potential of the basket to form an electric field in the basket.

Figure 3C:
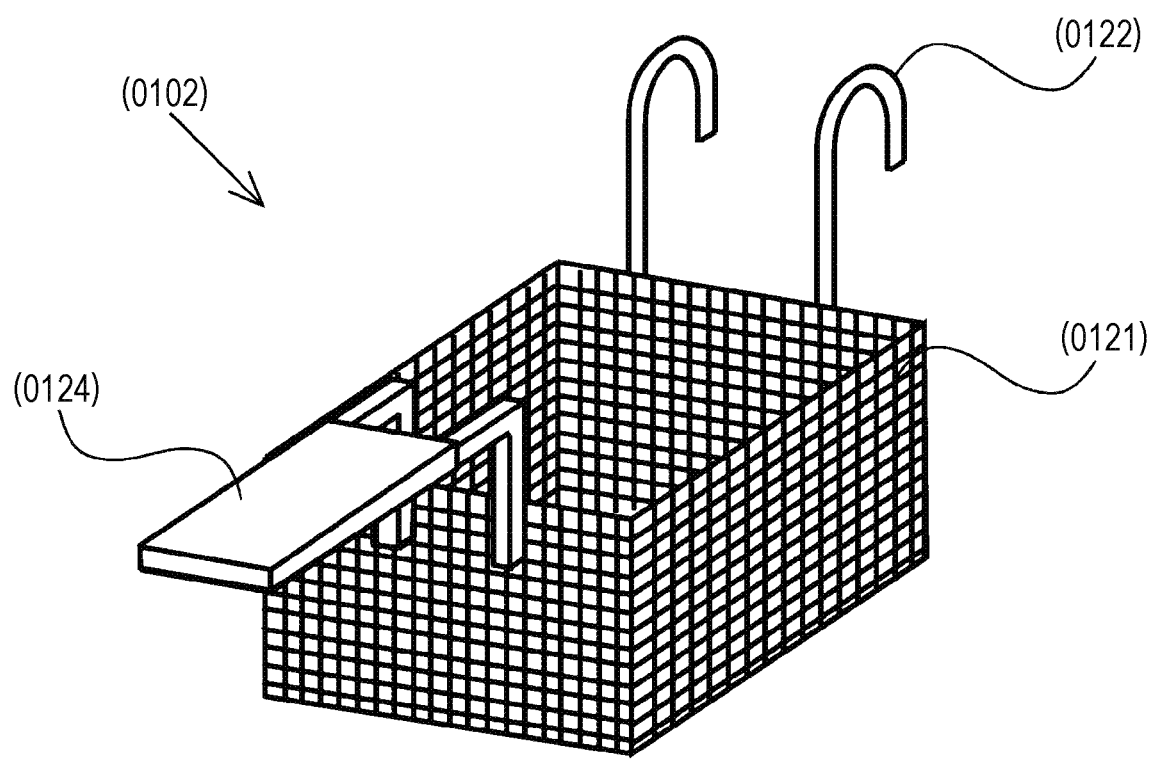
FIG. 3C is a schematic diagram of another basket for a fryer according to one embodiment of the present invention.

The metal mesh is not limited to a particular form. For example, the metal mesh may be punched metal (refer to FIG. 3A and FIG. 3B) or wires (refer to FIG. 3C). The basket may include a plurality of metal mesh pieces connected together by, for example, welding. However, the basket may be extruded from a single metal plate to prevent a contact failure in welded portions and uneven supply of an alternating current to the entire metal mesh.

The basket may have any size or shape appropriate for the oil pot. More specifically, the fryer according to one embodiment of the present invention can be used in the oil pot having any size. The mesh (or through-holes) of the metal mesh may have any size or shape and may be in any arrangement.

Basket Fastener

In combination with the pot fastener, the basket fastener allows the basket to be placed in the oil pot without the basket conducting electricity to the inner surfaces of the oil pot. Being in combination with the pot fastener herein refers to, for example, the pot fastener and the basket fastener being engaged with each other. Although the basket fastener may have any form, the basket fastener in the example shown in FIG. 3A and FIG. 3B include hooks 0122. The hooks are hooked on the hanger of the pot fastener to place the basket in the oil pot. For example, the hooks may be connected to the metal mesh in the basket by welding. Allowing the basket to be placed in the oil pot without the basket conducting electricity to the inner surfaces herein refers to placing the basket without the metal mesh in the basket and the metal plate of part of the inner surfaces of the oil pot conducting electricity between them.

Electricity Receiver

The electricity receiver receives electricity from the conducting electrode, and conducts electricity to the metal mesh in the basket. More specifically, the electricity receiver is in electrical communication with the metal mesh. When the electricity receiver comes into contact with the conducting electrode, the conducting electrode conducts an alternating current to the metal mesh through the electricity receiver. In the example shown in FIG. 3A and FIG. 3B, the basket includes an electricity receiving pad 0123, which is in electrical communication with the metal mesh, in a contact portion of the basket that comes into contact with the conducting electrode. In the structure including no electricity receiving pad, for example, the electricity receiver serves as a contact portion of the basket that comes into contact with the conducting electrode.

Handle

In some embodiments, the basket includes a handle 0124, which is insulated from the metal mesh in the basket. The handle allows a fryer user to easily place and remove the basket in and out of the oil pot. The metal mesh receives an alternating current during cooking of food materials, and thus the handle is to be insulated from the metal mesh. The metal mesh in the basket reaches a very high temperature when the basket is immersed in hot oil. Thus, the handle is to be formed from a material with low thermal conductivity.

In the example shown in FIG. 3A and FIG. 3B, the handle is attached to the basket with part of the handle welded to the metal mesh.

Electric Field Overview

Figure 4A:
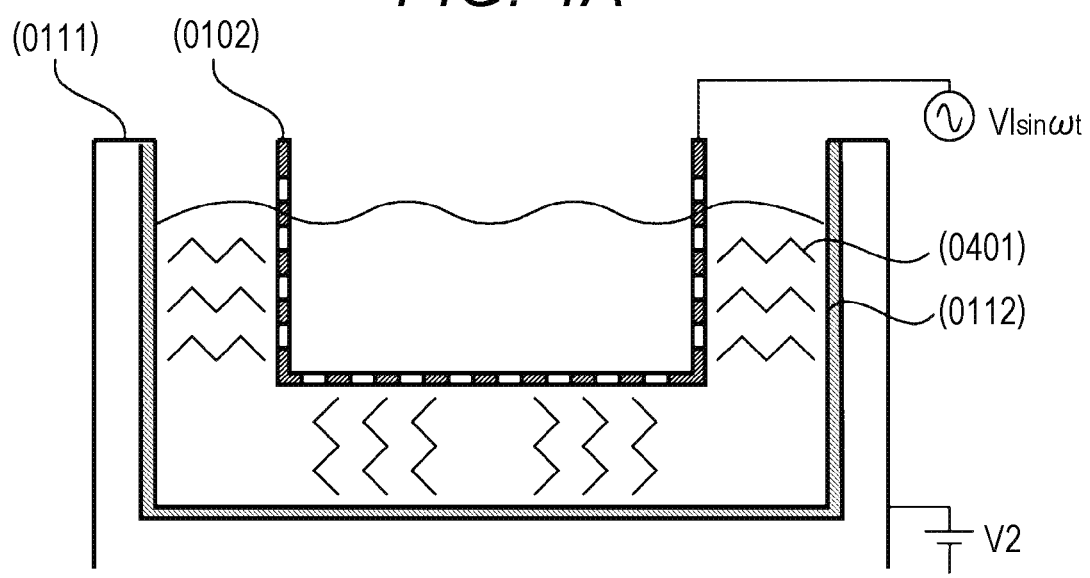
FIG. 4A and FIG. 4B are schematic diagrams describing an electric field forming during cooking with a fryer according to one embodiment of the present invention.
Figure 4B:
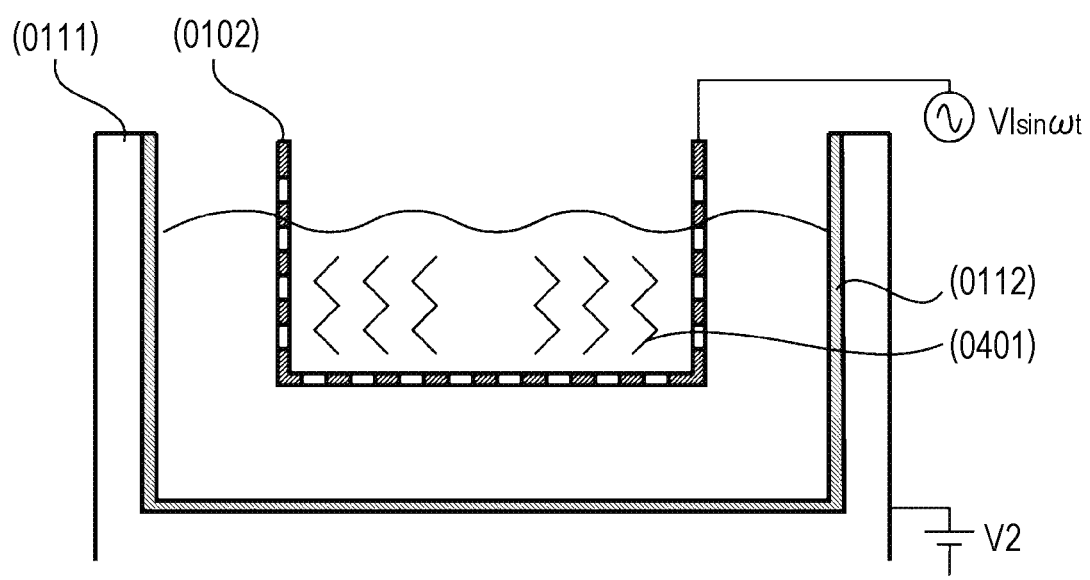

FIG. 4A and FIG. 4B show the overview of the electric field forming during cooking using the fryer according to one embodiment of the present invention. The examples illustrated in the figure use the basket shown in FIG. 3A and FIG. 3B. In the example shown in FIG. 4A, V1>V2, where V1sinωt (t is time) is the potential of the basket receiving an alternating current, and V2 is the potential of the metal plate of the oil pot. In the example shown in FIG. 4B, V1<V2. For convenience of explanation, components other than the oil pot and the basket are not shown, and the electric field forming when the basket is placed in the oil pot is simply shown. The example described below is based on speculations, and the electric field to form remains under investigation.

In FIG. 4A, when the basket conducts an alternating current, a dynamo electric field 0401 forms mainly between the basket 0102 and the inner surfaces 0112 of the oil pot 0111, and an electric field is applied to oil in the oil pot. Oil circulates in the oil pot, and food materials in the basket are fried with the oil receiving the electric field. In FIG. 4B, the basket conducting an alternating current has a higher potential than the metal plate of the oil pot. Thus, an electric field mainly forms in the basket rather than between the basket and the inner surfaces of the oil pot.

The structure of the fryer according to one embodiment of the present invention is described above by way of example. However, the fryer according to one embodiment of the present invention is not limited to the above example. Fryers with other example structures according to embodiments of the present invention will be described.

Example Structure 2

Potential Retaining Unit

In another example structure according to one embodiment of the present invention, the oil pot base may include a potential retaining unit, which retains the potential of the metal plate of the oil pot at a predetermined potential. Retaining the potential of the metal plate at a predetermined potential refers to, for example, grounding the metal plate to maintain the potential of the metal plate at zero. The fryer according to one embodiment of the present invention forms a dynamo electric field between the basket and the oil pot to form an electric field in the basket. When the oil pot has an unstable potential, an electric field with an unstable magnitude forms in the basket. The metal plate is thus grounded to form a stable electric field in the basket. The potential of the metal plate may be switchable.

Example Structure 3

Controller

In another example structure according to one embodiment of the present invention, the oil pot base may include a controller that controls the conductor to conduct electricity only when the pot fastener and the basket fastener are engaged with each other. The pot fastener and the basket fastener being engaged with each other refers to the basket being immersed in the oil pot for cooking food materials. The fryer according to one embodiment of the present invention including the controller can feed an alternating current to the basket through the conducting electrode of the conductor only when the basket is immersed in the oil pot to cook food materials. For example, the structure including a conductor having a conducting electrode constantly receiving an alternating current may apply an electric shock to a fryer user unintendedly touching the conducting electrode. The structure including a conducting electrode that receives an alternating current only while cooking food materials can reduce the likelihood of an electric shock.

Figure 5A:
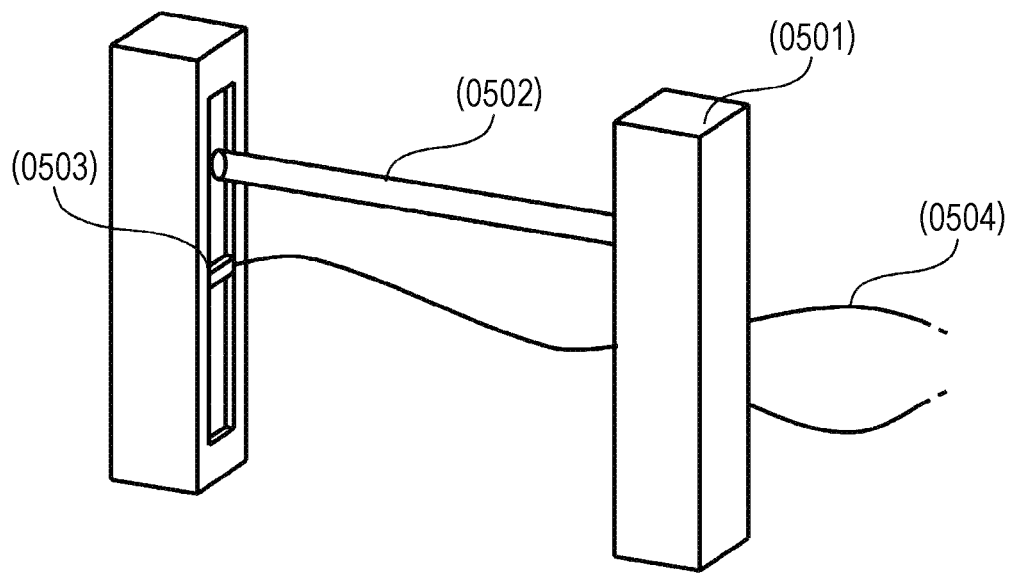
FIG. 5A to FIG. 5C are schematic diagrams of a pot fastener with a controller included in a fryer according to one embodiment of the present invention.
Figure 5B:
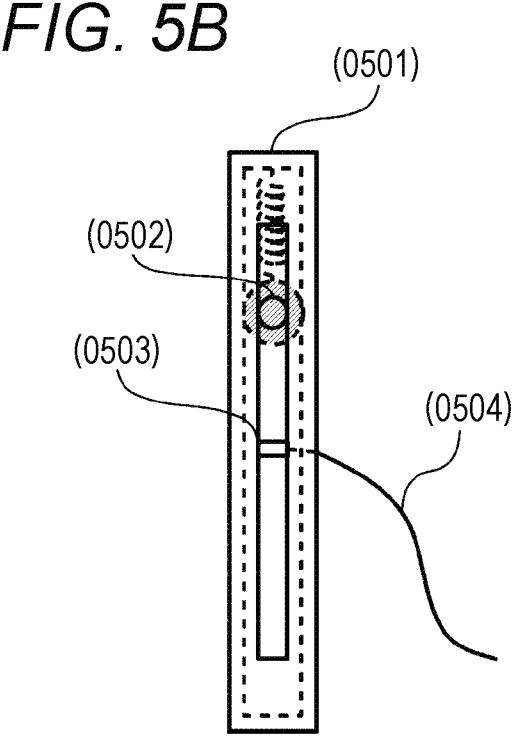
Figure 5C:
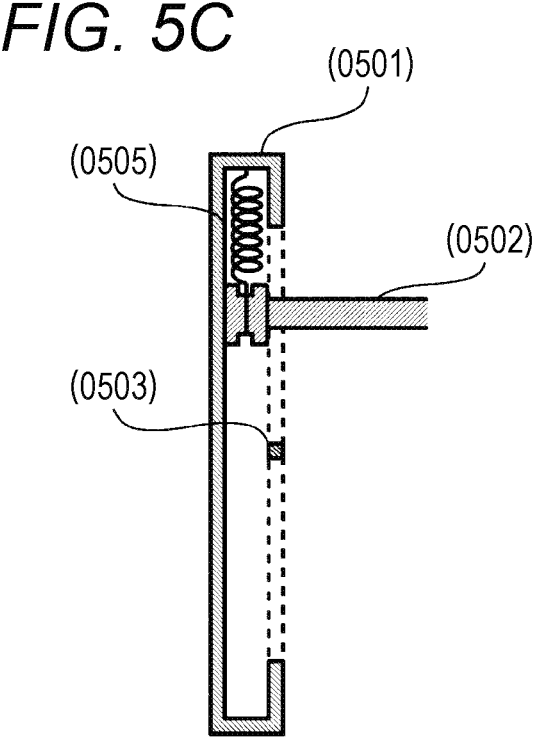

FIG. 5A to FIG. 5C are schematic diagrams of a pot fastener with a controller included in a fryer according to one embodiment of the present invention. FIG. 5A is a perspective view of the fastener, FIG. 5B is a side view of the fastener, and FIG. 5C is a cross-sectional view of the fastener. The pot fastener shown in FIG. 5A to FIG. 5C includes a metal bar 0502, which serves as a conducting electrode. The metal bar 0502 is supported by and vertically movable relative to a pair of pillars 0501. For example, for the basket fastener including hooks, when the hooks are hooked on the bar to place the basket in the oil pot, springs 0505, which support the bar inside the pillars, extend to lower the bar, and allow the bar to come into contact with electrodes 0503 and to be fixed in position. An alternating current is fed to the electrodes through cables 0504 connected to the power supply. When the bar comes into contact with the electrodes, the bar also receives an alternating current. The bar and the hooks are herein also in contact with each other, and an alternating current flows through the metal mesh in the basket through the hooks. When the basket is removed out of the oil pot, the bar returns to upper portions of the pillars under the force of the springs, and is apart from the electrodes. Thus, an alternating current is no longer fed to the bar. The electrodes included in the pot fastener shown in FIG. 5A to FIG. 5C are located at positions normally inaccessible to a fryer user. This structure prevents the fryer user from receiving an electric shock. As will be described in example structure 4, the pot fastener serves as the conductor, and the basket fastener serves as the electricity receiver in the example shown in FIG. 5A to FIG. 5C.

Example Structure 4

Figure 6A:
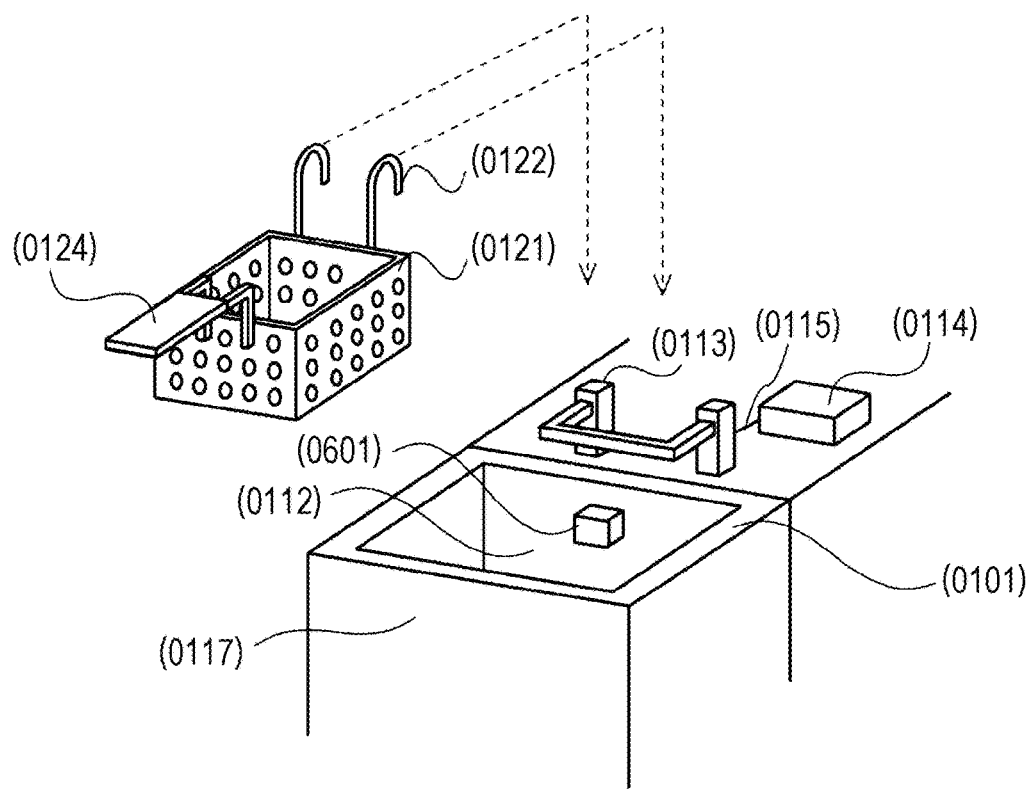
FIG. 6A and FIG. 6B are schematic diagrams of a fryer according to one embodiment of the present invention including a pot fastener serving as a conductor and a basket fastener serving as an electricity receiver.
Figure 6B:
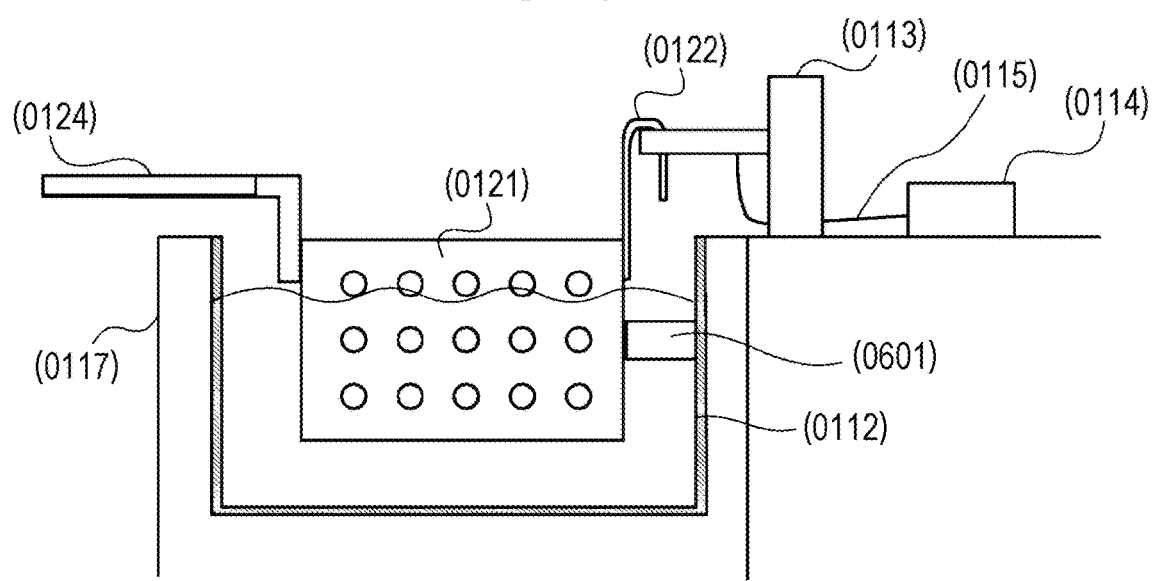

FIG. 6A and FIG. 6B are schematic diagrams of another fryer according to one embodiment of the present invention. FIG. 6A is a perspective view of the fryer, and FIG. 6B is a side view of the fryer. In the fryer shown in FIG. 6A and FIG. 6B, the pot fastener serves as the conductor, and the basket fastener serves as the electricity receiver. More specifically, an alternating current flows from the power supply to the hanger, which serves as the pot fastener in FIG. 2A and FIG. 2B, through the cable. The hanger can thus be used as the conductor. At least a portion of the hanger that comes into contact with the basket fastener and the electricity receiver is formed from a conductive material to serve as the conducting electrode. The conducting electrode and the inner surfaces of the oil pot are insulated from each other. The hooks included in the basket as the basket fastener are also used as the electricity receiver to conduct electricity to the metal mesh through the hooks. The hooks and the metal mesh are herein to be in electrical communication with each other. In some embodiments, the hooks are formed from a conductive material. At least the pot fastener serves as the conductor, or the basket fastener serves as the electricity receiver to reduce the number of components of the fryer. To prevent the metal mesh in the basket from coming into contact with the inner surface of the oil pot, the oil pot includes an insulating support 0601 on the inner surface. Instead of the inner surface of the oil pot, a support may be installed on, for example, a basket. In some embodiments, the support may be eliminated when the metal mesh and the inner surface are prevented from coming into contact with each other.

Example Structure 5

Figure 7A:
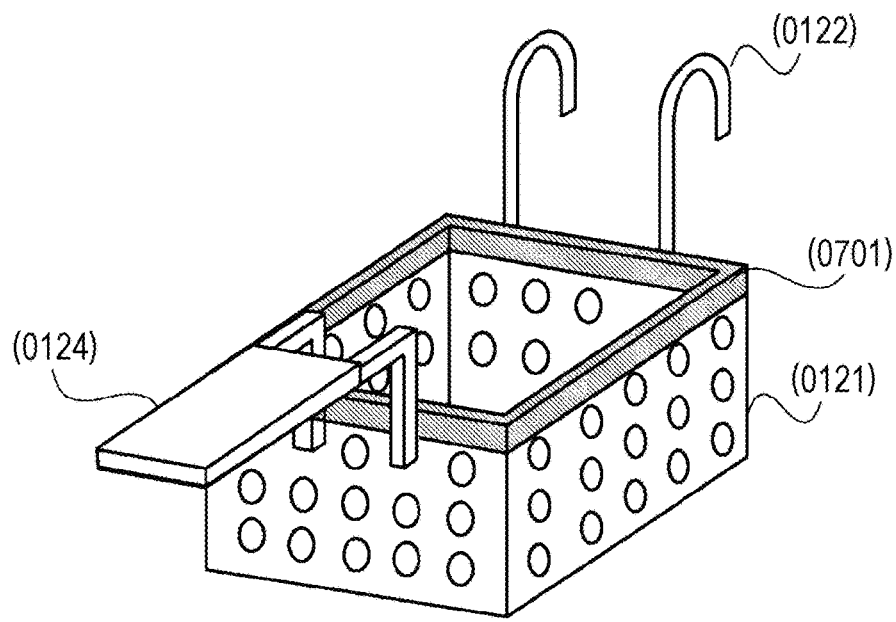
FIG. 7A and FIG. 7B are schematic diagrams of another basket for a fryer according to one embodiment of the present invention.
Figure 7B:
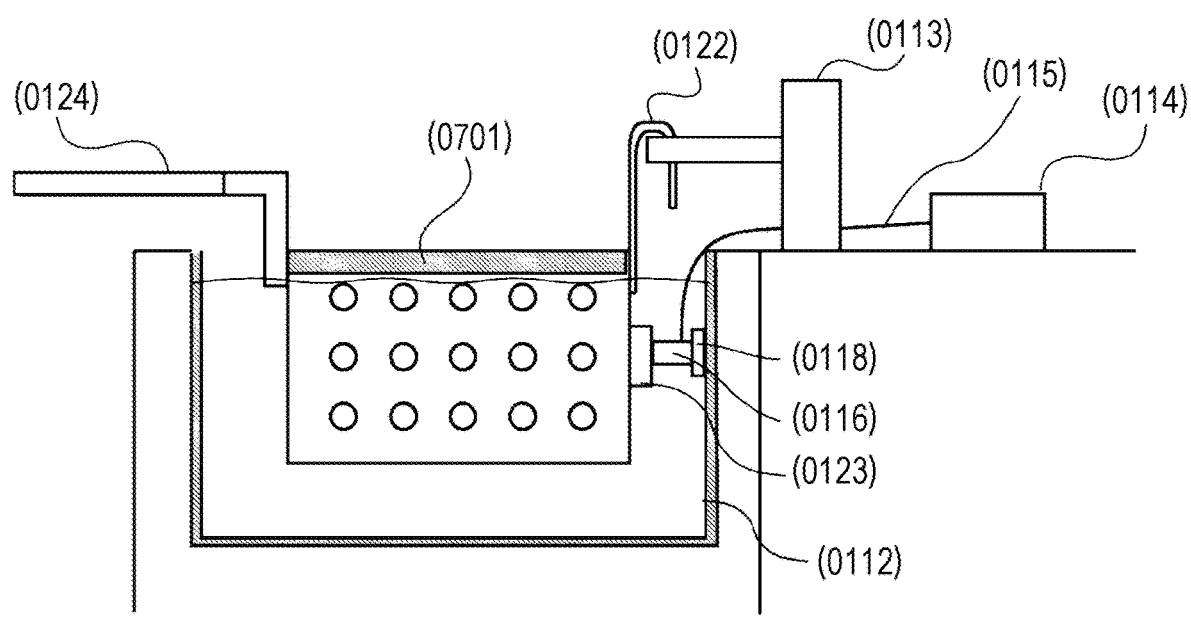

FIG. 7A and FIG. 7B are schematic diagrams of another basket for a fryer according to one embodiment of the present invention. FIG. 7A is a perspective view of the basket, and FIG. 7B is a side view of the basket immersed in the oil pot. The basket shown in FIG. 7A and FIG. 7B includes an insulating material 0701 in an area above a portion of the basket to be immersed in the cooking oil in the oil pot, or an oil-immersed portion. The oil-immersed portion herein refers to a portion of the side surfaces of the basket that is to be immersed in cooking oil when the basket is immersed in the oil pot. The area above the oil-immersed portion refers to an area that does not come in contact with the cooking oil. The depth of the cooking oil stored in the oil pot varies depending on the amount of food materials placed in the basket, and the oil-immersed portion also varies. The area above the oil-immersed portion is thus not precisely limited to the above area. For example, the insulating material may have a portion immersed in the cooking oil when the basket is immersed in the oil pot.

The area above the oil-immersed portion includes an insulating material to prevent a fryer user from receiving an electric shock. During cooking of food materials, an alternating current is fed to the metal mesh in the basket. A fryer user may unintendedly touch the portion of the metal mesh not immersed in the cooking oil, and may receive an electric shock. The portion of the metal mesh not immersed in the cooking oil thus includes an insulating material to prevent a fryer user from receiving an electric shock.

For example, for the structure including an insulating material in an area above the oil-immersed portion, a portion of the metal mesh of the side surfaces of the basket and located above the oil-immersed portion may include, for example, an insulating material, instead of the metal mesh. In some embodiments, the area of the metal mesh above the oil-immersed portion may be surface-coated with an insulating resin (e.g., Teflon, registered trademark).

As described in example structure 2, to retain the metal plate of the oil pot at a predetermined potential other than zero, a portion of the inner surface of the oil pot above the oil-immersed portion may include an insulating material.

Example Structure 6

Figure 8A:
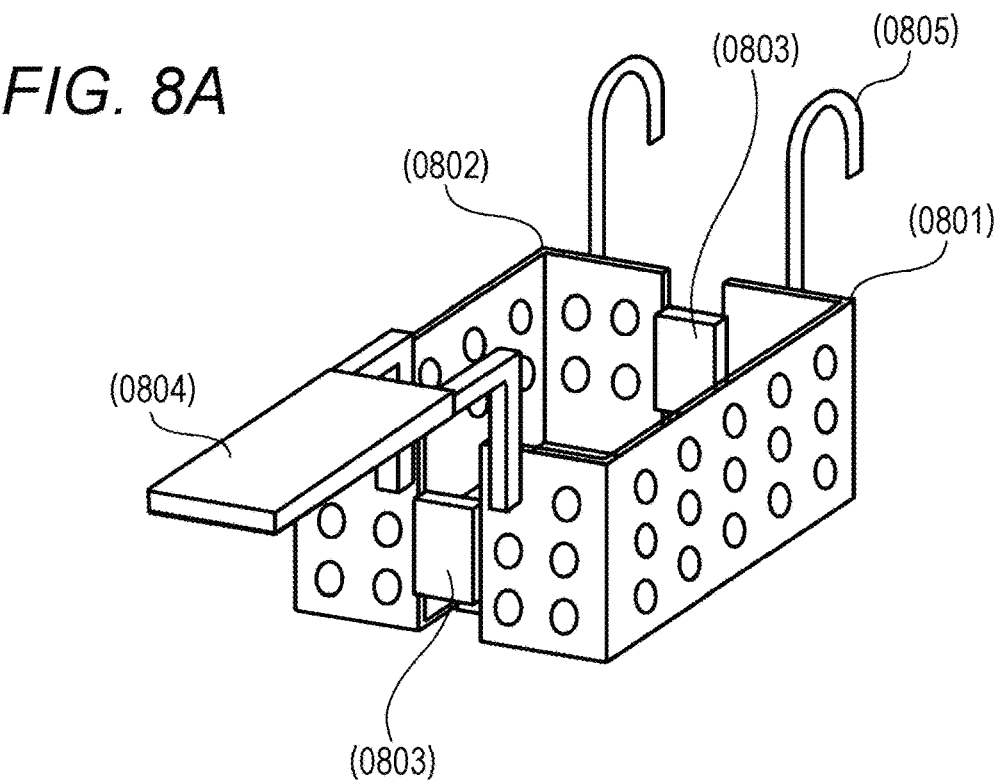
FIG. 8A to FIG. 8C are schematic diagrams of another basket for a fryer according to one embodiment of the present invention.
Figure 8B:
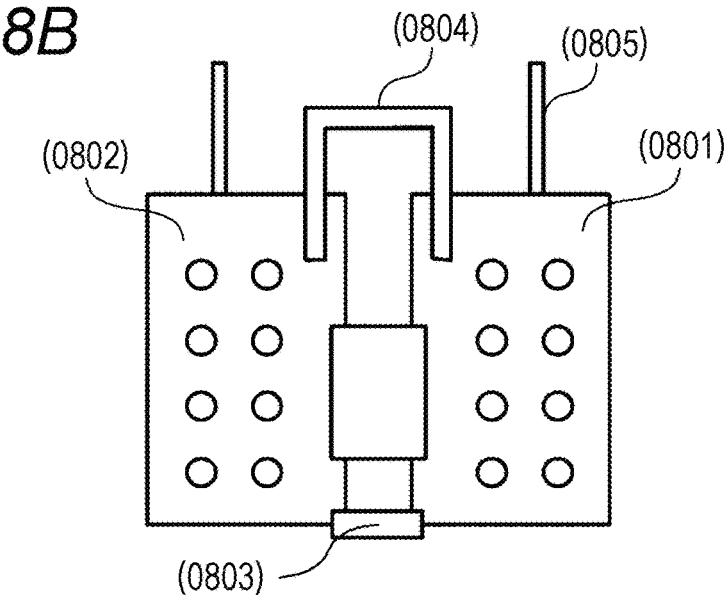
Figure 8C:
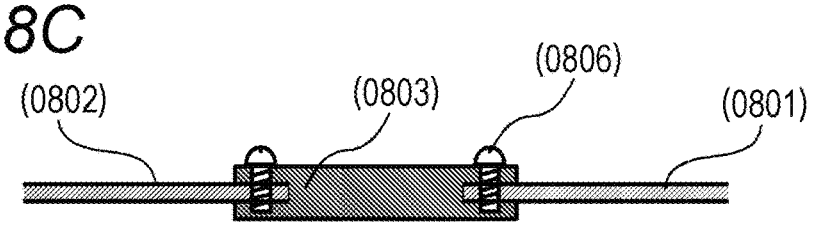

FIG. 8A to FIG. 8C are schematic diagrams of another basket for a fryer according to one embodiment of the present invention. FIG. 8A is a perspective view of the basket, and FIG. 8B is a side view of the basket viewed from a handle. The basket shown in FIG. 8A to FIG. 8C is rectangular parallelepiped, similar to the above basket. When the entire basket is divided with a line of symmetry, a pair of metal mesh pieces 0801 and 0802 are separated by an insulating plate 0803. In the example shown in FIG. 8A to FIG. 8C, insulating plates are attached on three sides, or the side at which the handle is attached, the side opposing the side at which the handle is attached, and the bottom. Any structure including a pair of metal mesh pieces insulated from each other may be used, other than the above structure. As shown in FIG. 8C in a cross-sectional view of the connection between the metal mesh pieces and the insulating plate, the metal mesh pieces and the insulating plate may be connected with screws 0806. Similarly to the basket described above, the basket shown in FIG. 8A to FIG. 8C includes a handle 0804 and hooks 0805.

The basket shown in FIG. 8A to FIG. 8C includes the pair of metal mesh pieces insulated from each other with the insulating plate. Thus, the basket allows one of the metal mesh pieces to conduct an alternating current, and the other to be grounded. For example, when the oil pot base described in example structure 1 is used, the oil pot base includes two conducting electrodes, serving as conductors, to conduct an alternating current to the respective metal mesh pieces, and to allow one of the metal mesh pieces to conduct an alternating current, and the other to be grounded. Thus, one of the metal mesh pieces can conduct an alternating current, whereas the other can be grounded. As in the fryer described in example structure 4, a fryer including the pot fastener serving as the conductor and the basket fastener serving as the electricity receiver may also include two hangers including the conducting electrodes to selectively conduct an alternating current to one of the conducting electrodes, and to ground the other conducting electrode. Thus, one of the metal mesh pieces can conduct an alternating current, and the other can be grounded.

Figure 9A:
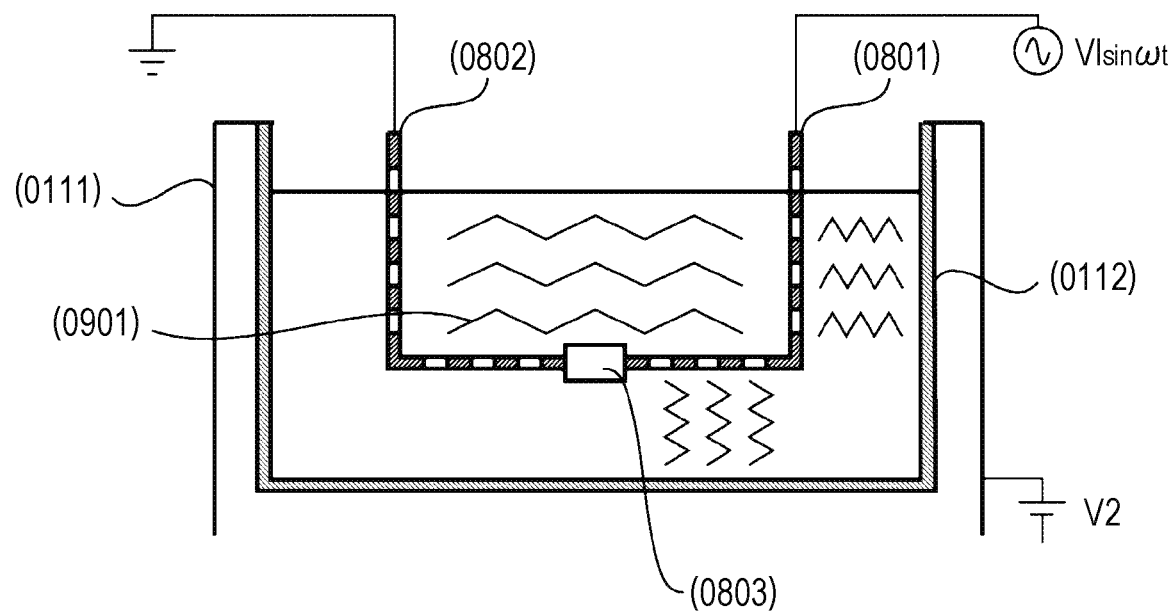
FIG. 9A and FIG. 9B are schematic diagrams describing an electric field forming during cooking with a fryer including a basket with example structure 6.
Figure 9B:
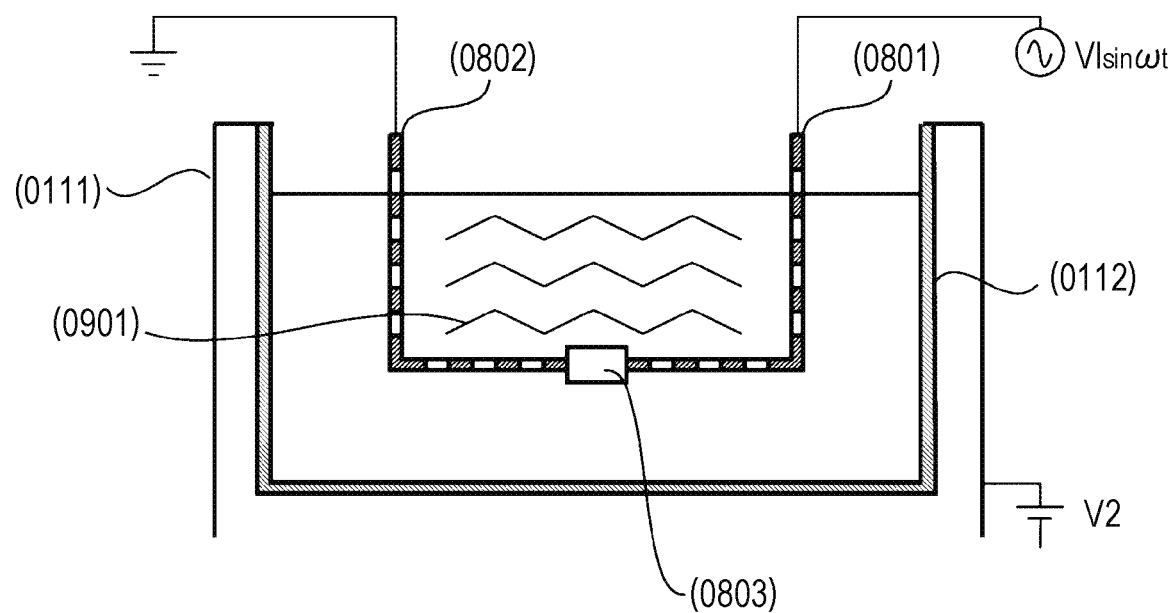

FIG. 9A and FIG. 9B show the overview of the electric field forming during cooking using the fryer including a basket with this example structure. In the example shown in FIG. 9A, V1>V2, where V1sinωt (t is time) is the potential of the basket receiving an alternating current, and V2 is the potential of the metal plate of the oil pot. In the example shown in FIG. 9B, V1<V2. For convenience of explanation, components other than the oil pot and the basket are not shown, and the electric field forming when the basket is placed in the oil pot is simply shown. The example described below is based on speculations, and the electric field to form remains under investigation.

In FIG. 9A, a dynamo electric field 0901 forms mainly between the pair of metal mesh pieces in the basket, and an electric field is applied to the oil in the basket. A dynamo electric field also forms between the metal mesh piece conducting an alternating current and the inner surfaces of the oil pot. In FIG. 9B, a dynamo electric field forms mainly inside the metal mesh piece receiving an alternating current.

The invention claimed is:

1. A fryer, comprising:
   an oil pot base including an oil pot having an inner surface that is at least partially a metal plate; and
   a basket placeable in and removable out of the oil pot, the basket including a metal mesh,
   the oil pot base including
      a pot fastener configured to allow the basket to be placed in the oil pot without the basket conducting electricity to the inner surface, and
      a conductor including a conducting electrode located at the oil pot base, the conducting electrode being insulated from the inner surface that conducts an alternating current to the metal mesh when the basket is placed in the oil pot, and
   the basket including
      a basket fastener configured to allow, in combination with the pot fastener, the basket to be placed in the oil pot without the basket conducting electricity to the inner surface, and an electricity receiver configured to receive electricity from the conducting electrode and conduct the electricity to the metal mesh when the basket is placed in the oil pot, wherein the pot fastener serves as the conductor, and the basket fastener serves as the electricity receiver, either of the pot fastener or the basket fastener serves as a hook and the other of the pot fastener or the basket fastener serves as a hook engaging portion, and the electricity is conducted only when the hook and the hook engaging portion are engaged to each other.

2. The fryer according to claim 1, wherein the hook engaging portion comprises a bar-shaped member or a hanger.

3. The fryer according to claim 1, further comprising:

a controller configured to control the conductor to conduct the electricity only when the pot fastener and the basket fastener are engaged with each other.

4. The fryer according to claim 1, wherein
the conducting electrode is located in an upper portion of the oil pot base on a surface of the oil pot opposing a handling side of the oil pot.

5. The fryer according to claim 1, wherein
the basket includes a handle insulated from the metal mesh in the basket.

6. The fryer according to claim 1, wherein
the basket includes an insulating material in an area above a portion to be immersed in cooking oil in the oil pot.

7. The fryer according to claim 1, wherein
the conductor conducts the alternating current to a first part of the basket.

8. The fryer according to claim 7, wherein
a second part of the basket is grounded.

9. The fryer according to claim 8, wherein
the basket is rectangular parallelepiped, and is symmetrically dividable about a line into the first part and the second part.

* * * * *